(12) United States Patent
Allen et al.

(10) Patent No.: US 8,843,373 B1
(45) Date of Patent: Sep. 23, 2014

(54) VOICE QUALITY SAMPLE SUBSTITUTION

(75) Inventors: Toby Edward Gedis Allen, Sydney (AU); Alexander Beck, Frenchs Forest (AU); Christopher William Kendall, Sydney (AU); Andrew W. Lang, Epping (AU); David Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 1439 days.

(21) Appl. No.: 11/759,364

(22) Filed: Jun. 7, 2007

(51) Int. Cl.
*G10L 21/00* (2013.01)

(52) U.S. Cl.
USPC ............ 704/270; 704/231; 704/246; 370/377

(58) Field of Classification Search
CPC . G10L 21/06; G10L 15/22; G10L 2015/0631; G10L 25/69; H04K 1/10; H04K 1/00; H04L 2012/6481; H04M 3/2236; H04M 7/006
USPC ...................... 704/261, 246, 270; 370/395.52
See application file for complete search history.

(56) References Cited

U.S. PATENT DOCUMENTS

| | | | | |
|---|---|---|---|---|
| 7,197,126 | B2 * | 3/2007 | Kanada | 379/202.01 |
| 7,299,176 | B1 * | 11/2007 | Lee et al. | 704/228 |
| 7,760,660 | B2 * | 7/2010 | Conway | 370/252 |
| 2002/0167936 | A1 * | 11/2002 | Goodman | 370/352 |
| 2002/0184373 | A1 * | 12/2002 | Maes | 709/228 |
| 2003/0088421 | A1 * | 5/2003 | Maes et al. | 704/270.1 |
| 2004/0071084 | A1 * | 4/2004 | El-Hennawey et al. | 370/230 |
| 2004/0240652 | A1 * | 12/2004 | Kanada | 379/201.1 |
| 2005/0015253 | A1 * | 1/2005 | Rambo et al. | 704/246 |
| 2005/0129006 | A1 * | 6/2005 | Aoyagi et al. | 370/377 |
| 2006/0029067 | A1 * | 2/2006 | Conway | 370/389 |
| 2006/0041431 | A1 * | 2/2006 | Maes | 704/270.1 |
| 2006/0247919 | A1 * | 11/2006 | Specht et al. | 704/201 |
| 2007/0127391 | A1 * | 6/2007 | Goodman | 370/252 |
| 2007/0203698 | A1 * | 8/2007 | Mapes-Riordan et al. | 704/231 |
| 2007/0244700 | A1 * | 10/2007 | Kahn et al. | 704/235 |
| 2008/0014883 | A1 * | 1/2008 | Topaltzas et al. | 455/187.1 |
| 2008/0069016 | A1 * | 3/2008 | Cao et al. | 370/289 |
| 2009/0170499 | A1 * | 7/2009 | Vaisanen et al. | 455/423 |

OTHER PUBLICATIONS

Bruce R. Gerratt et al., "Measuring voice quality with speech synthesis", Acoustical Society of America, 2001, p. 2560-2566.*

* cited by examiner

*Primary Examiner* — Douglas Godbold
*Assistant Examiner* — Mark Villena
(74) *Attorney, Agent, or Firm* — Sheridan Ross P.C.

(57) ABSTRACT

The present invention provides a communication monitoring and analysis method and system. More specifically, the present invention provides a method for analyzing problems within a communication network and further identifying sources of such problems based on voice sample substitutions. The voice sample substitutions used may correspond to canned speech samples used to highlight possible communication network problems.

22 Claims, 4 Drawing Sheets

| 304 | 308 | 312 | 316 | 320 | 324 |
|---|---|---|---|---|---|
| Sample ID | Date Of Occurrence | Audio Characteristics | Packet Characteristics | Possible Error Type | Suggested Audio Substitute Sample |

| 332 | 336 | 340 |
|---|---|---|
| Substituted Sample ID | Possible Error Type | Suggested Audio Processing |

VOICE QUALITY SAMPLE SUBSTITUTION

FIELD OF THE INVENTION

The invention relates generally to communication systems and networks. More particularly, the invention relates to troubleshooting communication systems for transmission quality issues.

BACKGROUND

Communication networks have developed and advanced significantly over the years. At one time, only circuit switching networks were employed to connect telephone or telegraph communication devices. With the advent of the Internet and other packet-based networks, communication technologies have evolved to utilize packet-based communication techniques. Communications that utilize packets of data rather than traditional analog technologies offer users new features and options never before available. For example, packet-based communication technologies allow information data to be sent along with the actual voice data. This feature allows communication devices to employ advanced communication protocols thereby making the communication session more enjoyable to the user.

Unfortunately, with the advent of new technologies comes a new set of problems. When a communication connection, such as a Voice over Internet Protocol (VoIP) connection, experiences voice quality problems it is often useful for a technician to know something about the type of quality problem so that the source of the problem can be more readily identified. The problem may be reported either by one of the conversation's participants or by an automated mechanism that monitors the quality of service (QoS) associated with the voice connection. The types of communication problems inherent in packet-based communication networks include delay, jitter, packet-loss, and out-of-order packets. Each of these problems may have a different cause and different combinations of these problems may have other causes. For example, some of these particular problems may be precipitated by faulty hardware in the communication network, whereas other problems may originate from software issues.

When such communication problems arise, a recording tool is often used to save a small portion of the conversation for later analysis. The saved sample of speech allows a network administrator to listen to the actual conversation and gain a more detailed picture of the problem. This can help the network administrator understand why the user might be unhappy as well as identify possible sources of the problem.

One downside to these current recording techniques is that such saved conversation fragments may include pieces of conversations that users do not want being heard by network administrators and other technicians. The reasons for desiring this privacy may range from personal reasons to security reasons. Additionally, some recorded conversation samples may be misleading to a technician if they have background noise that makes it difficult for the technician to pick out the real quality problems in the conversation. Another downside to current troubleshooting techniques is that storing the speech samples can be an expensive proposition, especially on large networks where many speech samples are being recorded.

SUMMARY

These and other needs are addressed by various embodiments and configurations of the present invention. The present invention is directed generally to a system, device, and method for using voice sample substitutions to troubleshoot communication network problems.

In accordance with one embodiment of the present invention, a method is provided for troubleshooting a communication system, the method generally comprising:

analyzing a speech sample from a message transmitted during a communication session;

creating a parameterization of the speech sample; and applying the parameterization to generic speech data, wherein the parameterized generic speech data substantially represents a simulation of the speech sample.

By parameterizing a speech sample from an actual conversation that has undergone communications problems then applying the parameterization to a generic speech data the need to store the actual speech sample is obviated. Instead of storing all of the speech data, only the parameters that describe the speech data need to be saved. As an additional benefit, the users engaged in the original conversation can feel safe reporting the communication problem to a network administrator because the users can be assured that the actual conversation will not be overhead by the network administrator. Rather, a network administrator will only hear the altered generic speech data that has the parameters of the original sample applied thereto.

The parameterization of the speech sample may be accomplished in a number of ways. It is one aspect of the preset invention to parameterize the speech sample by analyzing the packet header information or packet data. One example of packet header data that may be utilized is Real-time Transport Control Protocol (RTCP) information. The RTCP information can be utilized to identify Quality of Service (QoS) parameters. The QoS parameters may constitute part of the parameterization of the speech sample. The parameterization of the speech sample from packet data may be used to regenerate an audio sample comprising the generic speech data. The parameterization of the speech sample may comprise parameters determined by speech data, packet data, and combinations thereof.

It is another aspect of the present invention to parameterize the speech sample by analyzing the analog signal or speech data, usually after reconstruction by a decoder. The speech data can then be utilized to represent a parameterization of the speech sample. These parameters may then be used to regenerate an audio sample comprising the generic speech data.

The generic speech data used for playback to a network administrator may comprise a voice sample that does not contain any privileged or secure data. Rather, the generic speech data may comprise, for example, a voice sample of a person talking about the weather or singing a song. A single generic speech data sample may be used to represent a number of different actual speech samples. The parameters determined from each of the actual speech samples can be applied to the generic speech data sample, and that parameterized generic speech data sample can then be replayed as a representation of the actual speech samples. A number of different generic speech data samples may be available for use in representing actual speech samples. The parameterization of the actual speech samples may be applied to each of the different generic speech data samples to help display the problems with the network. In accordance with at least some embodiments of the present invention, a generic speech data sample may be selected from the available generic speech data samples based on its features and how well those features will display the problem encountered during the actual conversation. For example, if the users were talking over one another during the actual conversation, then a generic speech data sample having two users speaking may be employed. On the other hand, problems such as jitter and lost packets may be better displayed using a generic speech data sample having only one user speaking.

As used herein, a "message" comprises a unidirectional communication generated by a user. The message generally has an intended recipient or recipients, who may or may not differ from the generator of the message. That is, the message may be transmitted to another user or may be a message to one's self. A conversation sample may, however, comprise multiple messages being transmitted and received simultaneously. Accordingly, a speech sample from a conversation may comprise bidirectional communications with two or more messages.

As used herein "user" or "participant" is used to refer to any person or thing that is capable of making use of and/or interacting with a communication device and generating a message thereby.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to analyze communication systems, such as VoIP systems, for quality of service.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
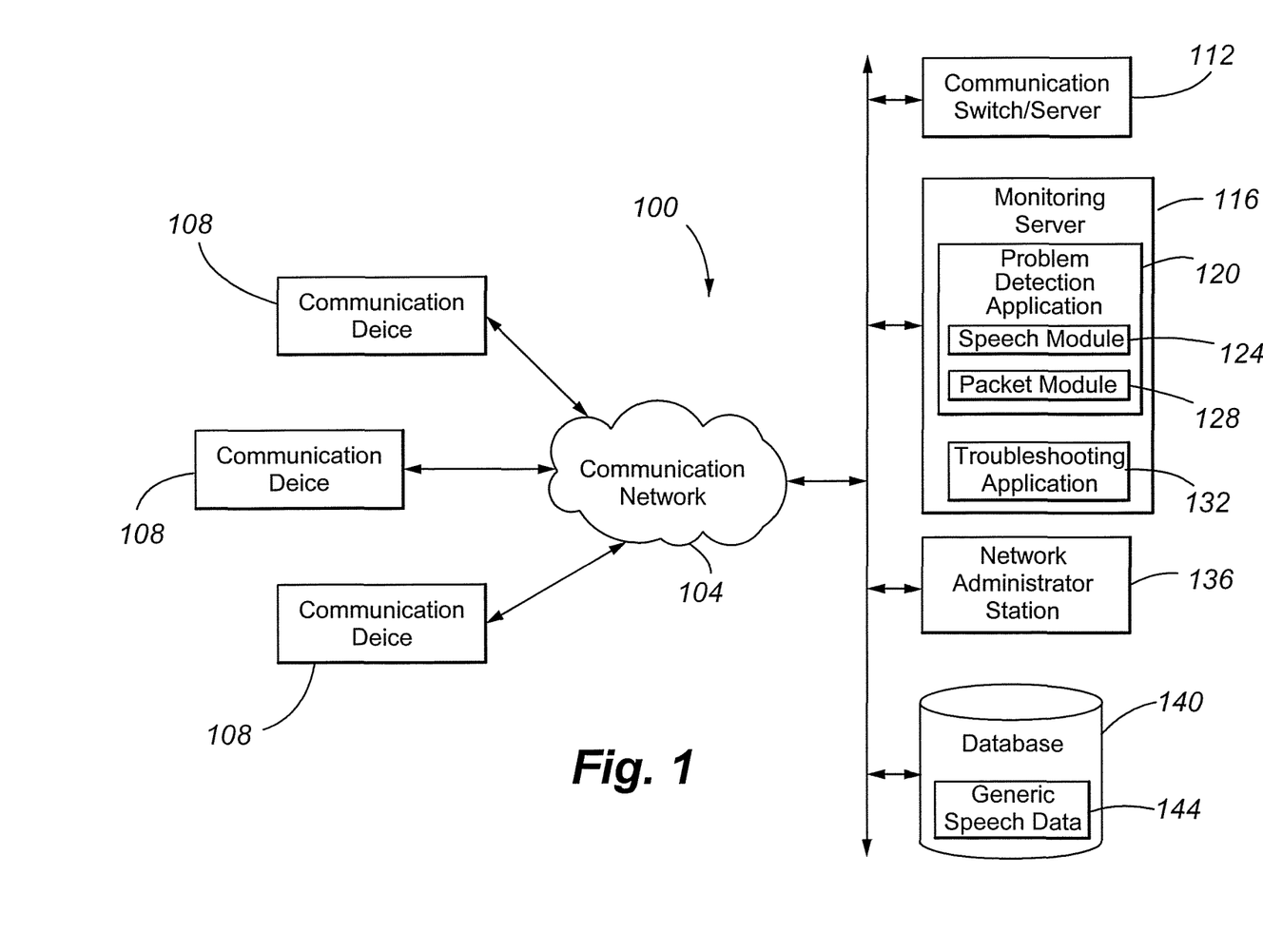
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication devices 108, a communication switch/server 112, a monitoring server 116 including a problem detection application and a troubleshooting application, a network administrator station 136, and a database 128 for storing generic speech data 144.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), the Internet, and any other type of packet-switched or circuit-switched network known in the art. In addition, it can be appreciated that the communication network 104 need not be limited to any one network type, and instead may be comprised of a number of different networks and/or network types.

The communication devices 108 may be packet-switched and/or circuit-switched and can include, for example, IP phones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, and the like.

The communication switch/server 112 may comprise a dedicated processor that functions to provide services to client devices (e.g., communication devices 108). The communication switch/server 112 generally enables communications between two or more communication devices 108 connected to the communication network 104. The communication switch/server 112 may comprise any type of processing medium operable to perform instructions stored on an electronic data storage area. The term "switch" or "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

The monitoring server 116 is adapted to provide communication network-monitoring capabilities. The monitoring server 116 is characterized by the ability to monitor the Quality of Service (QoS) afforded by the communication network 104. More specifically, the monitoring server 116 may be equipped with a problem detection application 120 that is used to identify when communication devices 108 are experiencing quality issues during a communication session. In accordance with certain embodiments of the present invention, the problem detection application 120 may be triggered to begin analyzing a conversation automatically. Alternatively, the problem detection application 120 may be manually activated, either in response to receiving a request by a participant of a communication session or by a network administrator.

The problem detection application 120 may include a speech module 124 and a packet module 128. The speech module 128 of the problem detection application 120 may be configured to determine if sub-standard communications are occurring between two or more communication devices 108 by analyzing the actual speech characteristics of a communication session. The speech module 124 may comprise a speech analysis tool that enables the speech module 124 to determine when a user is experiencing communication problems by analyzing the speech signals sent and/or received at a communication device. For example, the speech module 124 may be adapted to determine when talk-over is occurring by determining that a particular user is receiving speech at the same time he/she is speaking or by determining that both participants are speaking at the same time more than occurs during normal conversations. Sometimes such problems may be due to the impatience of the participants. However, there may be instances where problems of talk-over are occurring due to network delays or other network problems.

The packet module 128, on the other hand, may be adapted to detect communication network 104 deficiencies by analyzing packet data during a communication session. The packet module 128 may be adapted to read the Real-time Transport Control Protocol (RTCP) data associated with voice packets transmitted across the communication network 104. RTCP data may provide out-of-band control information for a Real-time Transport Protocol (RTP) flow. The RTCP data partners RTP in the delivery and packaging of multimedia data, but does not transport any data itself. RTCP is used periodically to transmit control packets to participants in a streaming multimedia session. The primary function of RTCP is to provide feedback on the QoS being provided by RTP. The packet module 128 may be adapted to gather statistics on a media connection and other information such as bytes sent, packets sent, lost packets, jitter, feedback, and round trip delay by referencing the RTCP data. The problem detection application 120 may use this information to determine if the QoS of the communication network 104 has slipped below a particular threshold defining a "good communication session." The types of RTCP packets that may be analyzed by the packet module include, without limitation, Sender report packets, Receiver report packets, Source Description RTCP Packets, Goodbye RTCP Packets, and Application Specific RTCP packets.

The packet module 124 may further be adapted to store the RTCP data corresponding to a communication session that is experiencing some type of problems. In accordance with certain embodiments of the present invention, the packet module 128 can store a sample of the RTCP data from the communication session. The stored sample RTCP data may then be applied to standard generic speech data 144. The application of the stored RTCP data generates an audio model of the call based on the standard generic speech data 144, without storing a sample of the actual conversation. Rather, the generic speech data 144 corresponds to a "canned speech" that is generic. After application of the RTCP data to the generic speech data 144, an example of the problems experienced by the participants of the communication session may be created without breaching the privacy of the actual conversation. This example can then be provided to the network administrator station 136 for playback to a network administrator.

The troubleshooting application 132 provided on the monitoring server 116 may be used to try and classify the type of problem, if any, occurring during a communication session. The troubleshooting application 132 may also be adapted to create suggestions as to what the source of the problem might be. For example, if the problem detection application 120 determines that the communication network 104 is experiencing some amount of packet delay beyond a predetermined threshold, then the troubleshooting application 132 may suggest that the problem is either due to network over-utilization (i.e., high usage) or due to a router failure or other type of transmission hardware failure.

The network administrator station 136 may comprise functionality similar to the communication devices 108 as well as the capability to monitor and control various parameters of the communication network 104. The suggestions regarding the possible sources of the problem may be provided to a network administrator station 136 to assist a network administrator in fixing the problem. A network administrator can then reference the suggestions provided by the troubleshooting application 132 as well as the audio model created to replicate the actual conversation problems of the participants. By having access to the audio model, the network administrator can experience the communication problems that the participants experienced without storing the actual conversation that occurred between the participants. Accordingly, a single generic speech data 144 may be altered in a number of different ways to represent different communication problems. The alteration of the generic speech data 144 may be based on the storage of problem conversation RTCP data. By storing the RTCP data instead of the actual conversation, storage capacity required to implement a network troubleshooting system is greatly reduced.

It should be emphasized that the configuration of the servers 112, 116, user communication devices 108, network administrator station 136, and other elements as shown in FIG. 1 is for purposes of illustration only and should not be construed as limiting the invention to any particular arrangement of elements.

Figure 2:
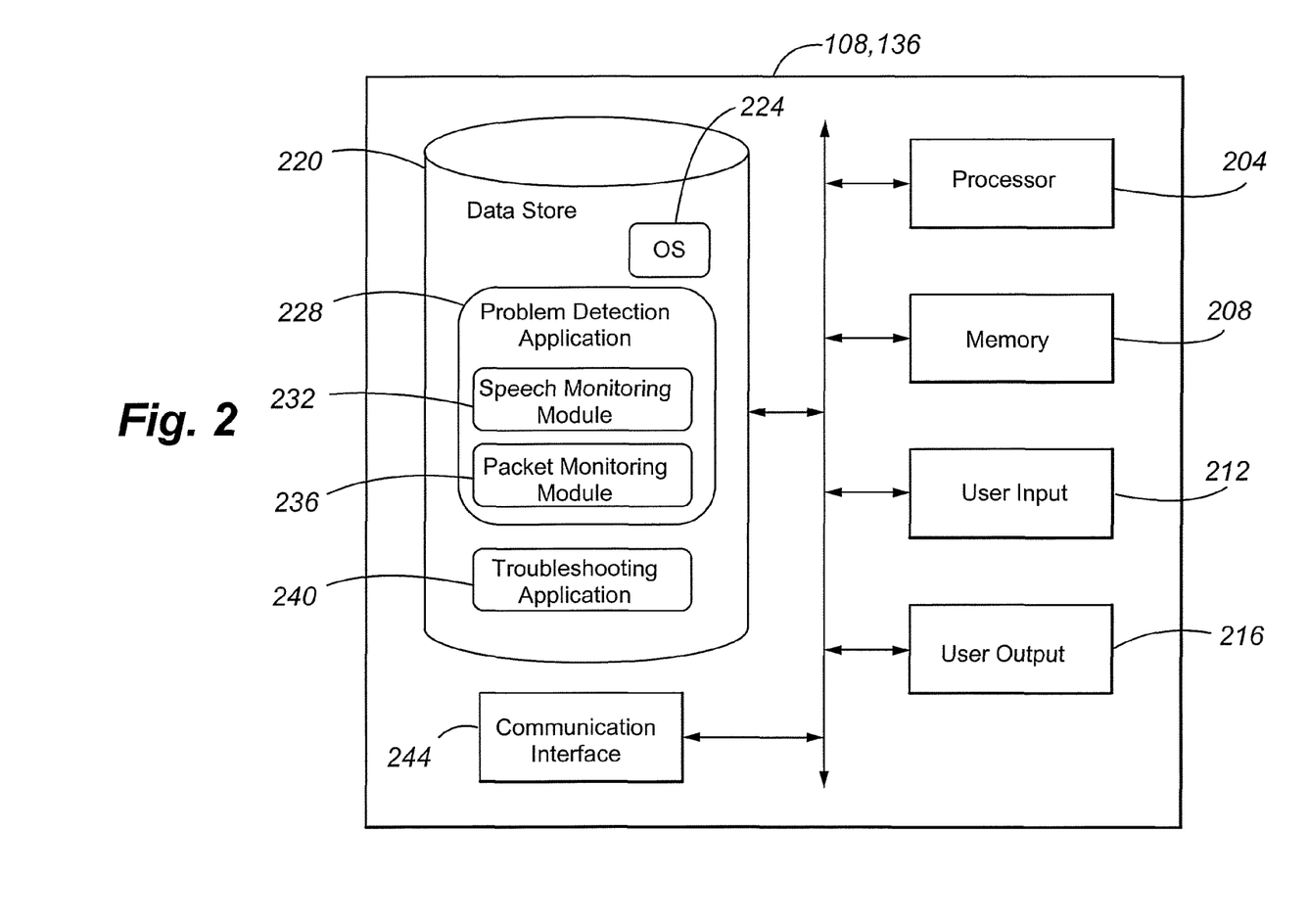
FIG. 2 is a block diagram depicting a communication device in accordance with embodiments of the present invention.

With reference now to FIG. 2, components of a communication device 108 or network administrator station 136, such as a communications or computing device, are depicted in block diagram form in accordance with embodiments of the present invention. The components may include a processor 204 capable of executing program instructions. Accordingly, the processor 204 may include any general-purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication device 108.

A communication device 108 may additionally include memory 208 for use in connection with the execution of programming by the processor 204 and for the temporary or long-term storage of data or program instructions. The memory 208 may comprise solid-state memory resident, removable or remote in nature, such as DRAM and SDRAM. Where the processor 204 comprises a controller, the memory 208 may be integral to the processor 204. The memory 208 may be volatile and/or non-volatile memory.

In addition, the communication device 108 may include one or more user inputs 212 and one or more user outputs 216. Examples of user inputs 212 include, without limitation, keyboards, keypads, touch screens, touch pads, and microphones. Examples of user outputs 216 include, but are not limited to, speakers, display screens (including touch screen displays), and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication device 108 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

The data storage 220 may further include a problem detection application 228, similar to the problem detection application 120 stored on the monitoring server 116. The problem detection application 228 may be activated when a user engages the user input 212. Alternatively, the problem detection application 228 may be automatically activated for all or some of the communication sessions that the user participates in. The problem detection application 228 may comprise a speech monitoring module 232 to monitor and possibly record portions of the speech that occurs during a communication session. The functionality of the speech monitoring module 232 may be similar to the speech module 124 on the monitoring server 116, with the exception that the speech monitoring module 232 is used to monitor speech associated with its communication device 108 and not other communication devices 108, unless such communication devices 108 are engaged in a communication session with the communication device 108 of the monitoring module 232.

The problem detection application may also comprise a packet monitoring module 236 adapted to monitor and possibly record packet statistics of a communication session. The packet monitoring module 236 may comprise similar functionality to the packet module 128, in that the packet monitoring module 236 may be adapted to monitor a conversation for problems by analyzing packet header data. More specifically, the packet monitoring module 236 may be adapted to monitor the quality of a communication session by monitoring and recording RTCP data from voice packets transmitted across the communication network 104.

In accordance with certain embodiments of the present invention, the speech 232 and packet 236 monitoring modules may continuously record data from a conversation for a predetermined amount of time. Each module 232, 236 may continuously maintain a 30 second history, for example, of the communication session in memory 208. As the session progresses, the history may change and data older than the defined history (e.g., more than 30 seconds old) may be purged from memory 208. Upon receiving a command to store a sample of the conversation, possibly because the conversation participant believes that there are quality problems, both modules 232, 236 may cause the second history to be stored along with data from the rest of the conversation. Alternatively, both modules 232, 236 may not maintain a conversation history but may only begin recording data from the conversation upon receiving a command to do so.

The data store 220 may further comprise a troubleshooting application 240. The troubleshooting application 240 may operate in conjunction with the problem detection application 228. In accordance with certain embodiments of the present invention, the troubleshooting application 240 receives data related to messages transmitted or received by the communication device 108 from the problem detection application 228, especially if the user is experiencing some sort of problems in connection with the transmission/reception of the messages. The troubleshooting application 240 may be adapted to try and rectify the problems, if it determines that such problems are occurring locally (e.g., packets are being played in an unordered fashion). Alternatively, the troubleshooting application 240 may simply provide suggestions about the source of the conversational problems being encountered by the user. Those suggestions may be provided to a network administrator or a user of the communication device 108.

The data storage 220 may also contain application programming and data used in connection with the performance of other functions of the communication device 108. For example, in connection with a communication device 108 such as a telephone or IP telephone, the data storage 220 may include communication application software. As another example, a communication device 108 such as a Personal Digital Assistant (PDA) or a general-purpose computer may include a word processing application in the data storage 220.

A communication device 108 may also include one or more communication network interfaces 244. Examples of communication network interfaces 244 include, but are not limited to, a network interface card, a modem, a wired telephony port, a serial or parallel data port, radio frequency broadcast transceiver, a USB port, or other wired or wireless communication network interfaces.

Figure 3A:
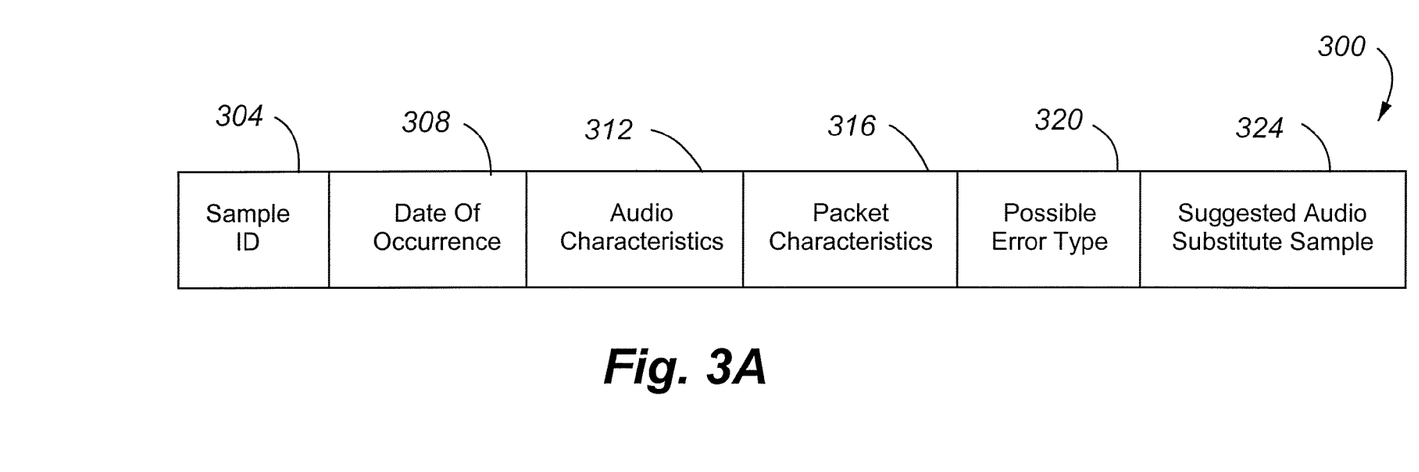
FIG. 3A is a first data structure employed in accordance with at least some embodiments of the present invention.
Figure 3B:
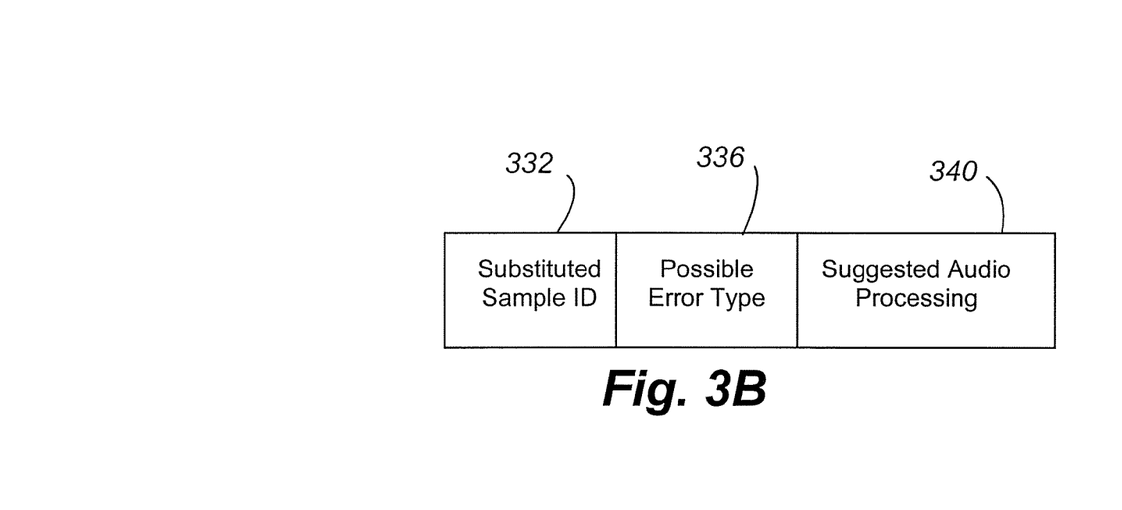
FIG. 3B is a second data structure employed in accordance with at least some embodiments of the present invention.

FIGS. 3A and 3B depict various data structures that may be employed in accordance with at least some embodiments of the present invention. Referring initially to FIG. 3A, a data structure 300 used to maintain data about a sample conversation will be described in accordance with at least some embodiments of the present invention. The data structure 300 may comprise one or more data fields for storing data related to a sample conversation, especially a conversation that has experienced some amount of quality problems. The data structure 300 may comprise a sample ID field 304 that is used to store an identifier for the conversation sample. The ID may comprise a randomly assigned alpha-numeric identifier or an identifier based on the participants of the conversation or possibly nature of the problem.

The data structure 300 may also comprise a date of occurrence field 308 to identify the time when the conversation occurred, and more specifically when the problems occurred. The date may be as general as the year, month, or day of occurrence. Alternatively, the date of occurrence may be defined to the granularity of hours, minutes, or even seconds.

The data structure 300 may also comprise data fields to store information about the characteristics of the conversation or conversation sample. Such fields may include an audio characteristics field 312 and a packet characteristics field 316. A speech module 124, 232 may determine and insert data in the audio characteristics field 312. The type of information maintained in the audio characteristics field 312 may include data about the volume of the transmitted/received signals, whether the participants were experiencing talk-over, whether there was "cracking" or other noise inserted into the signal, and other sorts of data related to the quality of the audio conversation. Although the audio characteristics field 312 may also be populated with an actual sample of the conversation, embodiments of the present invention provide techniques to troubleshoot network 104 quality problems without storing the actual voice data, which can be a memory expensive proposition.

The packet module 128, 236 may determine and insert data in the packet characteristics field 316. The type of information maintained in the packet characteristics filed 316 may include statistical data related to packet transmission and/or reception. Examples of packet characteristics data include, but are not limited to, packet transmission time, packet receipt time, round trip time, packet order statistics, packet loss statistics, jitter, jitter buffer delay, available bandwidth, latency, bytes sent per packet, and other data described in the packet header. These characteristics are particularly useful in creating an audio model of the actual speech because they are representative of the effects introduced into the conversation by the communication network and are not specific to the content of the conversation. Accordingly, the packet characteristics data can be applied to a different sample and the negative quality effects can still be heard, without listening to the actual conversation.

The data structure 300 may further comprise a possible error type field 320. The troubleshooting application 132, 240 may determine and insert data in possible error type field 320. Possible network 104 errors identified by the troubleshooting application 132, 240 include routing, congestion, hardware, and software problems. Alternatively, a user may describe the problems encountered during the communication session. These user-prepared comments may also reside in the possible error type as notes to a network administrator regarding the quality of the conversation.

Another field that may be included in the data structure 300 is a suggested audio substitute sample field 324. Data in this field may identify a particular generic speech data 144 that should be used to represent the conversation. Based on the information maintained in the characteristics fields 312, 316, the troubleshooting application 132, 240 may provide this suggestion. The suggestions for audio samples may vary based upon the characteristics of the problems encountered by the users. For example, some problems may best be modeled with a single message or unidirectional conversation, so a generic speech data 144 of just one person talking would be best suited to represent the actual communication session. Alternatively, if talk-over or network delay was a problem, then a suitable generic speech data 144 may include two messages. The network administrator may listen to a generic speech data 144 of two participants speaking at the same time, as altered based on the characteristics to see if the participants were just speaking over one another or if the problem was due to a network 104 failure.

Referring now to FIG. 3B, a second data structure 328 will be described in accordance with at least some embodiments of the present invention. The second data structure 328 may be used for the creation of a model audio sample from the generic speech data 144. The second data structure 328 may comprise a substitute sample ID field 332. The substitute sample ID field 332 may comprise an identifier of the generic speech data 144 that will be used to represent the actual conversation that occurred between the participants. The substitute sample ID may comprise a memory address corresponding to the memory location where the selected generic speech data 144 is stored on the database 140. Alternatively, the substitute sample ID may correspond to the actual name/ID of the generic speech data 144.

The second data structure 328 may further comprise a possible error type field 336. Data in the possible error type field 336 may be provided to a network administrator that is attempting to resolve the network problem.

Another data field that may be provided with the second data structure 328 is a suggested audio processing field 340. The suggested audio processing field 340 may comprise data related to how the substitute generic speech data 144 should be processed to resemble the original conversation. The suggested audio processing field 340 may comprise data from the audio 312 and packet 316 characteristics fields. Alternatively, the suggested audio processing field 340 may comprise a pointer to the characteristics fields 312, 316 such that the characteristics are applied to the generic speech data 144. The suggested audio processing field 340 may also comprise a user configurable portion that allows the network administrator to slightly alter the processing of the generic speech data 144 to further discern possible network 104 problems. Alternatively, the suggested audio processing field 340 may be locked such that it is not user configurable, thereby fixing the alteration of the generic speech data 144 to match the original conversation.

Figure 4:
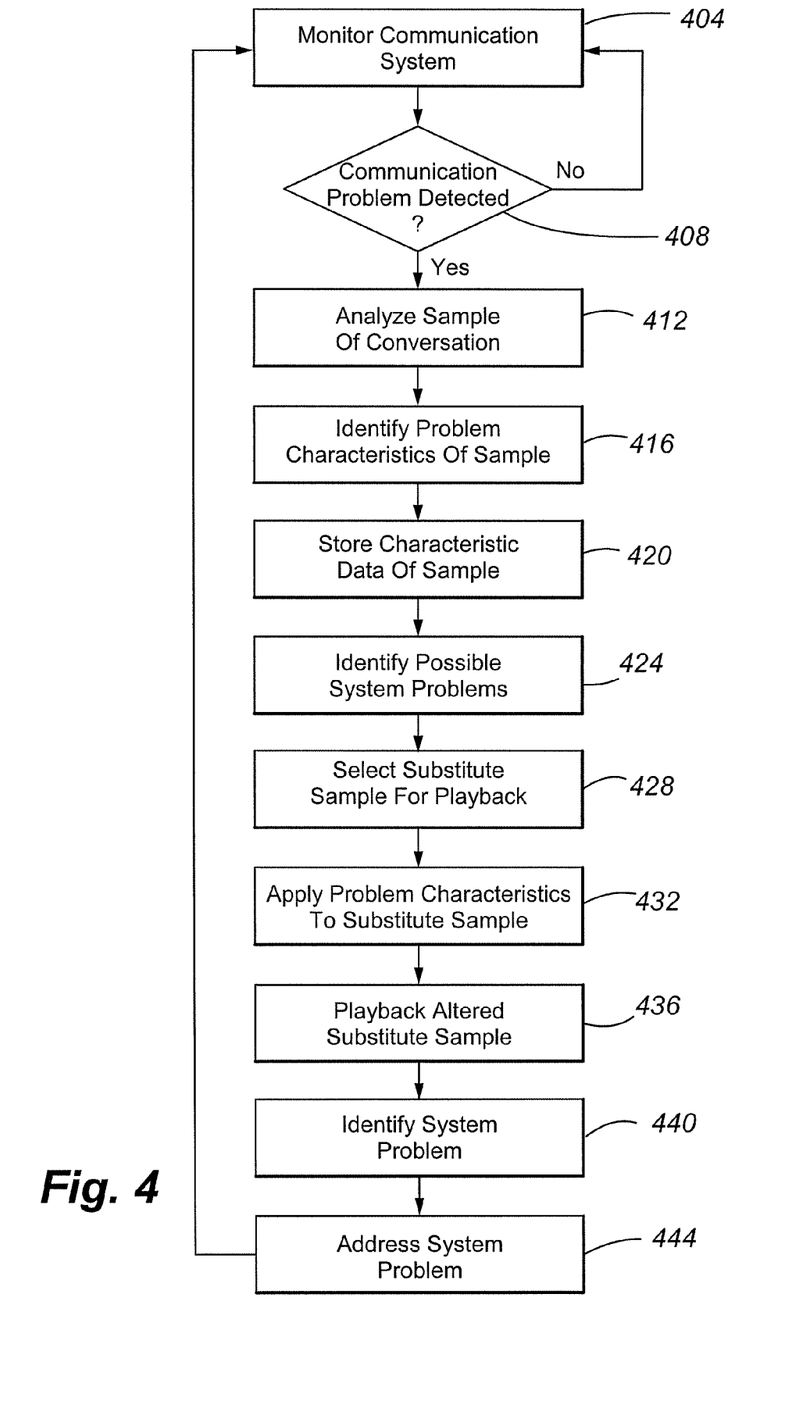
FIG. 4 is a flow chart depicting a method of troubleshooting problems in a communication system in accordance with at least some embodiments of the present invention.

With reference now to FIG. 4, a method of troubleshooting problems in a communication system 100 will be described in accordance with at least some embodiments of the present invention. The method may begin with the monitoring of the communication system 100, and more specifically the performance of the communication system 100 (step 404). The communication network 104, and performance parameters related thereto may be monitored during this particular step.

The method continues by determining if a communication problem has been detected (step 408). A communication problem may occur within the communication network 104, at a communication device 108, or at some other point in the communication system 100. The communication problem may be detected automatically by the problem detection application 120, 228 or manually by a user engaged in the conversation. If no communication problem is detected, then the method returns back to step 404 to continue monitoring the communication system 100.

However, if a communication problem has been detected, then the method continues with the problem detection application 120, 228 analyzing a sample of the conversation (step 412). The sample that is analyzed may correspond to a historical sample (e.g., a portion of the conversation that occurred prior to the detection of the problem) as well as portions of the conversation occurring after the detection of the problem. The historical portion of the sample may be analyzed from a temporary memory location 208 that is local to the communication device 108. Of course, in accordance with at least some embodiments of the present invention, the sample of the conversation that is analyzed may only comprise the conversation occurring after identification of the problem, if the conversation was not being recorded prior to detection. The analysis of the sample may occur in real-time, thereby obviating the need to store any portion of the voice data. Alternatively, the conversation sample may be recorded prior to analysis. The choice of recording the original sound sample could be made on the basis of individual user settings or system wide settings based on security requirements of the organization.

By analyzing the sample conversation, the problem detection application 120, 228 is able to identify problem characteristics of the sample (step 416). The problem characteristics may correspond to speech related problems (e.g., volume, noise, feedback, talk-over, etc.) and/or packet related problems (e.g., packet delay, packet loss, jitter, round trip time, etc.). The characteristics data is then stored as a representation of the sample conversation (step 420). The characteristics data may be stored in association with local or non-local memory. For example, the characteristics data may be stored in memory 208 of the communication device 108 or in the database 140. Alternatively, the characteristics data may be transmitted and stored at the monitoring server 116 or at the network administrator station 136. The amount of memory required to store the characteristics data for a sample conversation is generally much less (e.g., magnitudes less) than the amount of memory required to store the actual voice data of the conversation sample. Where the size of characteristics data may be on the order of bytes or kilobytes, the size of the actual voice data may be on the order of megabytes or larger. This affords use of a smaller memory for implementation of a troubleshooting system.

Once the characteristics data have been recorded for the sample conversation, the troubleshooting application 132, 240 identifies possible network problems based on the characteristics (step 424). The troubleshooting application 132, 240 may reference a table that has various characteristics correlated to potential system problems. For example, certain problems may be more indicative of network 104 failure, whereas other problems may correspond to communication device 108 failure.

With the possible problems identified, the method continues by selecting a substitute sample for playback (step 428). The substitute sample may be selected from the generic speech data 144 stored in the database 140. The types of generic speech data 144 available for selection may correspond to a single voice stream, two voice streams, and more than two voice streams (e.g., for use in representing a conference call between three or more participants). There may also be different variations between the generic speech data 144. For instance, some generic speech data 144 may correspond to someone speaking quickly as compared to other generic speech data 144 where a user is speaking more slowly. The generic speech data 144 that is selected should be the one that will most accurately reflect the problems of the actual conversation sample. Therefore, for a conversation having only one speaking participant, a single voice stream generic speech data 144 should be selected. The different variations of generic speech data 144 may be used to help illustrate different problems such as lots of sibilants, continuous sounds, background music, and so on. The content of the generic speech data 144 does not necessarily need to match the conversation sample. Moreover, the selected generic speech data 144 does not need to be selected such that it can replicate the exact conditions (e.g., exact tone, frequency, and timing of the speaker) of the original conversation sample. Rather, the selected generic speech data 144 is selected based on its ability to demonstrate the detected problem to a network administrator.

After the generic speech data 144 has been selected, the method continues by applying the problem characteristics associated with the conversation sample to the selected substitute sample (i.e., the generic speech data 144) (step 432). Each recorded sample segment can be considered as a stream of data packets that were originally continuous and uniform in packet spacing. The recorded user conversation (i.e., the problem sample) has had this stream changed somewhat by system defects such as VoIP transmission problems that include lost packets, delayed packets, and the variation of delays causing jitter. Since the number and time of the arriving packets can be determined precisely, these delays and losses are known for the actual conversation, and the voice content from the generic speech data 144 can be treated in the same way. This allows the playback of the generic speech data 144 to appear as if it were arriving with the same altered characteristics.

Delay, overall, is slightly more difficult to assess, as it requires absolute knowledge of when the packets are sent, rather than their relative arrival times. Delay usually causes problems such as talk-over. Simulation of talk-over is a more difficult operation, but with some analysis of the voice stream, and where the delay has been determined, a sample conversation using the generic speech data 144 can be created to match the original delay characteristics. For example, detecting when someone is speaking is well known in the art. By knowing the delay in the conversation, it is possible to work out what each participant was hearing when they spoke. Creating a complicated conversation with the correct speech lengths would be very difficult, but for any given instance of talk-over, a replacement stream can be easily constructed because only one overlap needs to be accommodated. The other end of each sentence of the generic speech data 144 does not need to be precisely timed.

In the event that a full conversation is required for playback, the conversation could be simulated by taking the generic speech data 144 that comprises a series of interchanges of speech and chopping out the middle of some of the speech segments to make the timing fit. Alternatively, the segments could have their lengths altered by speeding them up, slowing them down, or inserting a pause at some point where it makes no difference to the natural flow of the conversation. Multiple exchanges with different length characteristics could be used and assembled into a conversation as required. Hence, one approach is to analyze the analog speech signal to identify segments of speech, silence, and also identify which speaker was speaking during each speech segment. This particular data may be determined and applied by the speech module 124, 232.

The application of packet information and statistics related to the sample conversation to the generic speech data 144 may be relatively easier than application of audio characteristics. For example, RTCP information already contains information about round trip time, loss, jitter, out-of-order intervals, hops, etc. This information can be used to insert segments of silence into the generic speech data 144 to produce a simulation of the original conversation. Regardless of whether audio characteristics or packet characteristics are applied to the generic speech data 144, the effect is to produce some parameterization of the original conversation, then regenerate a simulation of that conversation using the parameters and the generic speech data 144.

Once the characteristics have been applied to the generic speech data 144, the method continues by providing the altered generic speech data 144 to the network administrator (step 436). The network administrator may also pick other generic speech data 144 to give him/her a toolkit of samples that help illustrate different system problems. Based on the playback of the altered generic speech data 144, the network administrator may be able to identify the system problem (step 440). Based on the identification of the problem, the network administrator can then address the system problem and attempt to rectify the QoS (step 444). After the sample conversation has been analyzed and the problem addressed, the characteristics related to the sample conversation may be deleted from memory further relieving memory requirements.

In accordance with at least one alternative embodiment of the present invention, the parameterization of a sample conversation may be analyzed and used to select a preconfigured generic speech data 144. In other words, rather than applying the parameterization of the sample conversation to a generic speech data 144, a system administrator may be provided with a number of different generic speech data 144 that have already been altered to display various problems. Based on the results of parameterizing the sample conversation, one or more such preconfigured generic speech data 144 may be selected, for example via a parameterization mapping, and used for playback during troubleshooting. By utilizing preconfigured generic speech data 144 the amount of processing required to represent a sample conversation by generic speech data 144 may be reduced. Furthermore, in networks with a large number of users, the amount of memory required to store all of the preconfigured generic speech data 144 may still be less than the amount of memory required to store all of the sample conversations.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for troubleshooting VoIP communication systems. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method of troubleshooting a communication system, comprising:

analyzing a non-generic speech sample from a message transmitted during a communication session, the non-generic speech sample comprising an utterance of a user during an actual conversation with at least one other user;

creating, with a problem detection application being executed by one or more of a server and communication device, a parameterization of the non-generic speech sample, the creating a parameterization of the non-generic speech sample comprising determining audio characteristics of the non-generic speech sample;

assigning a data structure associated with the parameterization of the non-generic speech sample, wherein the data structure comprises one or more data fields for storing data related to the audio characteristics of the non-generic speech sample, and wherein the one or more data fields for storing data related to the audio characteristics of the non-generic speech sample comprises an audio substitute sample data field;

based on the parameterization, selecting, with the problem detection application, generic speech data as a representative of the non-generic speech sample, wherein the parameterized generic speech data has substantially similar characteristics to the non-generic speech sample, wherein the non-generic speech sample comprises sensitive data uttered by the user, wherein the generic speech data is void of the sensitive data uttered by the user, and wherein the generic speech data is further selected based on the audio substitute sample field associated with the non-generic speech sample.

2. The method of claim 1, further comprising playing the generic speech data to an entity that was not a participant in the communication session.

3. The method of claim 1, further comprising:
listening to the generic speech data; and
identifying a problem with the communication system based on effects introduced to the generic speech data based on a parameterization of the non-generic speech data.

4. The method of claim 1, further comprising applying the parameterization of the non-generic speech sample to the selected generic speech data, wherein the parameterized generic speech data substantially represents a simulation of the non-generic speech sample.

5. The method of claim 4, wherein creating a parameterization of the non-generic speech sample further comprises:
determining packet characteristics of the non-generic speech sample.

6. The method of claim 5, wherein packet characteristics of the non-generic speech sample are determined by analyzing packet header information and wherein the packet characteristics of the non-generic speech sample comprise at least one of packet transmission time, packet receipt time, round trip time, packet order statistics, packet loss statistics, jitter, jitter buffer delay, available bandwidth, latency, and bytes sent per packet.

7. The method of claim 1, wherein the audio substitute sample field comprises at least one of delay, talk-over, volume, existence of noise, and interchanges of speech.

8. The method of claim 1, further comprising mapping the non-generic speech data to a selected generic speech data based on the parameterization of the non-generic speech data, the selected generic speech data is selected from a list of generic speech data, wherein each instance of generic speech data in the list of generic speech data comprise at least one distinguishing feature, and wherein the at least one distinguishing feature of the selected generic speech data causes it to be a closer simulation of the non-generic speech sample than other generic speech data in the list of generic speech data.

9. A non-transitory computer readable medium comprising processor executable instructions operable to perform the method of claim 1.

10. An apparatus for troubleshooting a communication system, comprising:
a non-transitory computer readable medium comprising a problem detection application adapted to analyze a speech sample from a message transmitted during a communication session, the speech sample comprising an utterance of a user during an actual conversation with at least one other user, the problem detection application being further configured to create a parameterization of the speech sample and then apply the parameterization to generic speech data and comprising a speech module, the speech module is adapted to determine audio characteristics of the speech sample, wherein the characteristics of the speech sample comprise a problem encountered during the communication session, wherein the characteristics of the speech sample comprise an audio substitute sample data field, wherein the parameterized generic speech data substantially represents a simulation of the speech sample, wherein the speech sample comprises sensitive data, wherein the generic speech data is void of the sensitive data, wherein the generic speech data is selected based on the problem encountered during the communication session, and wherein the generic speech data is further selected based on the audio substitute sample data field.

11. The apparatus of claim 10, wherein the problem detection application is further adapted to playback the parameterized generic speech data to an entity that was not a participant in the communication session.

12. The apparatus of claim 10, further comprising a troubleshooting application adapted to analyze the parameterized generic speech data and identify a problem with the communication system based on effects introduced to the generic speech data by the parameterization of the speech sample.

13. The apparatus of claim 12, wherein the troubleshooting application is further adapted to select the generic speech data for parameterization from a list of generic speech data, wherein each of the generic speech data in the list of generic speech data comprise at least one distinguishing feature, and wherein the at least one distinguishing feature of the selected generic speech data causes it to be a closer simulation of the speech sample than other generic speech data in the list of generic speech data.

14. The apparatus of claim 10, wherein the problem detection application comprises a packet module, wherein the packet module is adapted to determine packet characteristics of the speech sample.

15. The apparatus of claim 14, wherein the packet module is adapted to determine packet characteristics of the speech sample by analyzing packet header information and wherein the packet characteristics of the speech sample comprise at least one of packet transmission time, packet receipt time, round trip time, packet order statistics, packet loss statistics, jitter, jitter buffer delay, available bandwidth, latency, and bytes sent per packet.

16. The apparatus of claim 10, wherein the problem encountered during the communication session comprises at least one of delay, talk-over, volume, existence of noise, and interchanges of speech.

17. A communications troubleshooting system, comprising:
means for analyzing a non-generic speech sample obtained from a message transmitted during an actual communication session between two or more users;
means for parameterizing the non-generic speech sample, the means for parameterizing comprising means for determining audio characteristics of the non-generic speech sample;
means for assigning a data structure associated with the parameterization of the non-generic speech sample, wherein the data structure comprises one or more data fields for storing data related to the audio characteristics of the non-generic speech sample, and wherein the one or more data fields for storing data related to the audio characteristics of the non-generic speech sample comprises an audio substitute sample data field; and means for selecting, based on the parameterization of the non-generic speech sample, generic speech data as a representative of the non-generic speech sample, wherein the parameterized generic speech data has substantially similar characteristics to the speech sample, wherein the non-generic speech sample comprises sensitive data, wherein the generic speech data is void of the sensitive data, and wherein the generic speech data is further selected based on the audio substitute sample field associated with the non-generic speech sample.

18. The system of claim 17, further comprising means for playing the generic speech data to an entity that was not a participant in the communication session.

19. The system of claim 17, wherein the means for parameterizing comprises means for determining packet characteristics of the non-generic speech sample.

20. The system of claim 17, wherein the audio substitute sample field comprises at least one of delay, talk-over, volume, existence of noise, and interchanges of speech.

21. The system of claim 17, wherein the means for determining packet characteristics of the non-generic speech sample is adapted to analyze packet header information and wherein the packet characteristics of the non-generic speech sample comprise at least one of packet transmission time, packet receipt time, round trip time, packet order statistics, packet loss statistics, jitter, jitter buffer delay, available bandwidth, latency, and bytes sent per packet.

22. The system of claim 17, further comprising means for applying the parameterization of the non-generic speech sample to the generic speech data, wherein the parameterized generic speech data substantially represents a simulation of the non-generic speech sample.

* * * * *